United States Patent [19]

Schofield et al.

[11] Patent Number: 4,930,742

[45] Date of Patent: Jun. 5, 1990

[54] REARVIEW MIRROR AND ACCESSORY MOUNT FOR VEHICLES

[75] Inventors: Kenneth Schofield; William W. Gallmeyer; Theodore C. Zwiep, all of Holland, Mich.

[73] Assignee: Donnelly Corporation, Holland, Mich.

[21] Appl. No.: 173,307

[22] Filed: Mar. 25, 1988

[51] Int. Cl.$^5$ .............................................. A47F 7/14
[52] U.S. Cl. .............................. 248/475.1; 248/225.1; 248/558; 350/631; 403/408.1
[58] Field of Search .................. 248/467, 475.1, 225.1, 248/222.1, 224.4, 558; 350/631; 403/388, 408.1

[56] References Cited

U.S. PATENT DOCUMENTS

| | | |
|---|---|---|
| D. 231,769 | 6/1974 | Searer et al. |
| 354,976 | 12/1986 | Field |
| 1,110,568 | 9/1914 | Ogden |
| 1,164,613 | 12/1915 | Jewell |
| 1,206,871 | 12/1916 | Locke |
| 1,353,253 | 9/1920 | Livingston et al. |
| 1,377,355 | 5/1921 | Knapp |
| 1,388,292 | 8/1921 | Noisom |
| 1,615,936 | 2/1927 | Donovan |
| 1,657,334 | 1/1928 | Adams |
| 1,667,545 | 4/1928 | Goddard |
| 1,761,393 | 6/1930 | Hoegger |
| 1,912,902 | 6/1933 | Kramer |
| 2,048,939 | 7/1936 | Leathorn |
| 2,161,771 | 6/1939 | Alexander |
| 2,303,108 | 11/1942 | Blackburn |

(List continued on next page.)

FOREIGN PATENT DOCUMENTS

| | | |
|---|---|---|
| 551492 | 1/1956 | Canada |
| 523597 | 4/1956 | Canada |
| 468473 | 7/1914 | France |
| 617921 | 2/1927 | France |
| 686239 | 7/1930 | France |
| 811385 | 4/1937 | France |
| 1311945 | 11/1962 | France |
| 2233826 | 1/1975 | France |
| 478282 | 2/1953 | Italy |
| 58-185339 | 10/1983 | Japan |
| 933078 | 8/1963 | United Kingdom |
| 1008411 | 10/1965 | United Kingdom |
| 1020794 | 2/1966 | United Kingdom |
| 1053545 | 1/1967 | United Kingdom |
| 1053546 | 1/1967 | United Kingdom |
| 1387591 | 3/1975 | United Kingdom |
| 2046687A | 11/1980 | United Kingdom |

OTHER PUBLICATIONS

Exhibit A-Photographs of General Motors wire cover Part No. 16507661-it is believed this part has been on sale for more than one year in the United States.

(List continued on next page.)

Primary Examiner—David L. Talbott
Attorney, Agent, or Firm—Price, Heneveld, Cooper, DeWitt & Litton

[57] ABSTRACT

A mounting adaptor is disclosed for removably securing an interior rearview mirror assembly to a mounting support on the inner surface of a vehicle window such as a windshield. The adaptor preferably has a recessed channel on one side for receiving a window mounting button and a projection on the opposite surface simulating a window mounting button for removably mounting a rearview mirror assembly. The projection may be shaped to receive the same or a different mirror assembly channel mount as compared to the support on the window to allow conversion from one assembly to another without changing the window support. The adaptor may also include a support for a vehicular accessory such as a microphone, compass, headlight dimmer, light, moisture sensor, radar detector or the like. Such accessory is thus supported for convenient use by the driver or other vehicle occupant and in a highly advantageous operating position without interference with the rearview mirror, its replacement, interchangeability or adjustability. A wire cover may also be included on the adaptor.

An assembly combining a microphone and a support for mounting a rearview mirror adjacent a driver within a vehicle is also disclosed.

20 Claims, 5 Drawing Sheets

4,930,742

Page 2

U.S. PATENT DOCUMENTS

| | | |
|---|---|---|
| 2,405,912 | 8/1946 | Tinnerman . |
| 2,414,223 | 1/1947 | De Virgilis . |
| 2,417,269 | 3/1947 | Robertson . |
| 2,428,649 | 10/1947 | Brown . |
| 2,461,315 | 2/1949 | De Virgilis . |
| 2,509,422 | 5/1950 | Clapp . |
| 2,570,569 | 10/1951 | Leathorn . |
| 2,600,751 | 6/1952 | Gazda . |
| 2,685,859 | 8/1954 | Donnell . |
| 2,737,852 | 3/1956 | Porter et al. . |
| 2,884,478 | 4/1959 | Becker et al. . |
| 3,006,048 | 10/1961 | Windish . |
| 3,035,160 | 5/1962 | Cleminshaw . |
| 3,104,830 | 9/1963 | Rock . |
| 3,131,251 | 4/1964 | Ryan . |
| 3,188,038 | 6/1965 | Grout ............................ 248/222.1 |
| 3,377,117 | 4/1968 | Biscow . |
| 3,425,657 | 2/1969 | Doyle . |
| 3,428,286 | 2/1969 | Del Pesco . |
| 3,459,470 | 8/1969 | Hahn . |
| 3,515,365 | 6/1970 | Jones et al. . |
| 3,534,938 | 10/1970 | Jordan et al. . |
| 3,576,359 | 4/1971 | Cesh . |
| 3,624,347 | 11/1971 | Todd et al. . |
| 3,711,632 | 1/1973 | Ghirardi . |
| 3,778,537 | 12/1973 | Miller . |
| 3,928,894 | 12/1975 | Bury et al. . |
| 4,033,245 | 7/1977 | DeRees . |
| 4,039,818 | 8/1977 | Hickman . |
| 4,094,591 | 6/1978 | Lafont . |
| 4,096,349 | 6/1978 | Donato . |
| 4,174,864 | 11/1979 | Viertel et al. . |
| 4,175,833 | 11/1979 | Talbot . |
| 4,219,693 | 8/1980 | French . |
| 4,245,874 | 1/1981 | Bishop . |
| 4,254,931 | 3/1981 | Aikens et al. . |
| 4,384,167 | 5/1983 | Nestor . |
| 4,443,831 | 4/1984 | Godfrey et al. . |
| 4,498,738 | 2/1985 | Kumai . |
| 4,588,267 | 5/1986 | Pastore . |
| 4,591,956 | 5/1986 | Majchrzak . |

OTHER PUBLICATIONS

Exhibit B-Photographs of Gentex wire clip-it is believed that this clip has been on sale in the United States for more than one year.

Exhibit C-Photographs of a prototype wire cover structure developed by Donnelly Corporation, Holland, Michigan and disclosed to General Motors/Chevrolet Truck on Mar. 13, 1986.

Exhibit D-Drawings from co-pending patent application Serial No. 07/021,636, filed Mar. 4, 1987 assigned to the common assignee, Donnelly Corporation, and illustrating various forms of a wire cover device adapted to extend from a rearview mirror mount to a vehicle interior headliner.

Exhibit I-photographs and sample of a mirror mounting attachment sold by General Motors Corporation and believed to be first released by General Motors Service Parts Division on Jul. 9, 1987.

Exhibit II-photographs and sample of a mirror mounting attachment manufactured and sold by Wink Corporation at least one year prior to the filing date of the present application, namely, Mar. 25, 1988.

REARVIEW MIRROR AND ACCESSORY MOUNT FOR VEHICLES

BACKGROUND OF THE INVENTION

This invention relates to mounting structures for inside rearview mirror assemblies in vehicles and, more particularly, to a mounting adaptor adapted to mate with a support secured to the inside surface of a window such as a windshield to allow support of various types of mirror assemblies as well as various vehicle accessories adjacent to the mirror assembly. The invention also relates to supports for a microphone adjacent and in the vicinity of a rearview mirror for use by the driver and other passengers in the vehicle.

For many years, rearview mirror assemblies have been supported within vehicles by securing them to mounting supports, known as "buttons", adhered to the upper inside surface of the front windshield of the vehicle. The rearview mirror assembly typically includes a swivel joint ending with a mounting member known as a channel mount having a recessed channel slot for slidably receiving the windshield button or support therein through a bottom opening. While the shape and size of windshield mounting buttons have long been standardized throughout the vehicle industry, at least in the United States, various proposals for modified shapes and sizes of windshield buttons have recently been proposed. This creates a problem for rearview mirror manufacturers who would be required to stock both new and old assemblies having channel mounts adapted to fit the new and old style windshield mounting buttons. Likewise, in the aftermarket for vehicle accessories, both new and old style rearview mirror assemblies would have to be offered having channel mounts adapted to both new and old windshield buttons.

Automobiles and trucks in recent years have also included an increasing amount of instrumentation and accessories. It is desired to mount various of these accessories and instruments in places conveniently accessible to the driver or other vehicle passengers, or in locations where operation and function of such accessories is most advantageous. For instance, the upper front windshield area is one of a very few locations in a conventional vehicle which allows satisfactory operation of a magnetic compass. Also, with the increasing use of mobile/cellular telephones in vehicles, the inclusion of microphones for use by various persons within the vehicle has been desired.

Further, many rearview mirror assemblies are now adapted to perform functions other than merely holding a reflective mirror element in correct position. Items such as map, courtesy or reading lamps, information displays, clocks, compasses and the like have been built into the mirror assemblies. With such mirrors, there is a need to route electrical cables between the vehicle interior roof headliner and the mirror assembly to provide appropriate electrical power and to allow ease and convenience in the removal and replacement of the mirror unit.

In the past, it has been known to support certain vehicle accessories such as a headlight dimming sensor on the channel mount for the inside rearview mirror assembly when secured to a windshield mounting button. In several vehicles in the past few years, a spring clip has been attached to the bottom of a conventional rearview mirror channel mount for the attachment of a headlight dimming sensor. The electrical connection and cable running from that sensor pass behind the channel mount and are at least partially shielded as they extend toward the vehicle headliner by a rectilinear, channel-shaped wire cover secured between the channel mount and windshield support button by fitting a tab on the wire cover over the inner end of the channel mount set screw. However, this structure included a ball member integral with the channel mount to which a swivel joint and rearview mirror assembly was permanently attached. Thus, to replace the rearview mirror assembly or accommodate a different shaped windshield mounting button, it is necessary to provide a complete new assembly including the channel mount on the rearview mirror assembly. Also, the prior known wire cover was inadequately supported at the channel mount and was difficult to retain in place, especially over relatively stiff wires.

Accordingly, the prior mirror support structures failed to provide for convenient substitution of different mirror assemblies, failed to accommodate the support of different types of vehicle accessories, failed to suggest any support for microphones, and failed to properly integrate wire covers for electrical cables and wiring from the accessories in a secure manner.

SUMMARY OF THE INVENTION

Accordingly, the present invention provides a mounting adaptor for use with interior rearview mirror assemblies which allows substitution or change of the rearview mirror assembly to accommodate different types of windshield mounted supports easily and conveniently. The adaptor can also provide a support for different vehicle accessories adjacent the rearview mirror without interfering with the mounting of the rearview mirror assembly, or its replacement, interchangeability or adjustability. Support of the accessories on the adaptor places the accessories or information therefrom in an appropriate position for vehicle operator sighting and use, allows the addition of desirable options without the need to modify existing vehicle components, and positions the accessories for their most advantageous functional operation. In addition, the adaptor may provide an appropriate wire cover for shielding and concealing electrical wires leading from either the mirror assembly or the accessory mounted on the adaptor to the vehicle headliner area.

Also, the invention contemplates an appropriate mounting for a microphone within the vehicle interior adjacent the rearview mirror assembly in a convenient location for use by the driver and other vehicle passengers.

In one aspect, the invention is a mounting adaptor for securing an interior rearview mirror assembly to a mounting support when the support is affixed on the inner surface of a vehicle window such as the windshield. The adaptor includes an adaptor body, mounting means on one surface of the adaptor body for securing the mounting support when fixed on the window, and securing means on a second surface of the adaptor body for removably mounting a rearview mirror assembly to the adaptor body. Accordingly, the adaptor body spaces the rearview mirror assembly outwardly of the window and the mounting support.

In preferred forms of this invention, where the rearview mirror includes a channel-like mounting member, the mounting means is a recessed channel on the windshield facing surface of the adaptor while the securing means is a projection on the interior facing surface of the adaptor for receiving a channel-like mounting member thereover. The recessed channel may have a different sectional shape from the projection to allow attachment of a rearview mirror assembly having one channel mount shape to a windshield support member of different shape.

The adaptor body may also include an aperture extending therethrough and communicating with the recessed channel for receiving a fastener for engaging the mounting support to secure the adaptor in place. In one form, the fastener may extend from the channel-like mounting member of the rearview mirror assembly such that the rearview mirror assembly and the adaptor are simultaneously locked in place. Alternately, the adaptor may include a separate fastener for securement to the windshield mounted support while the channel-like mounting member from the rearview mirror assembly is separately fastened to the adaptor with its own fastener.

In another aspect of the invention, a mounting adaptor is provided for securing an accessory adjacent an interior rearview mirror in a vehicle. Such adaptor includes an adaptor body, first mounting means on a first surface of said adaptor body for securing a mounting support when the support member is secured to the inner surface of a vehicle window such as a windshield, and securing means on a second surface of the adaptor body for removably mounting a rearview mirror assembly on the adaptor. The adaptor body also includes support means for supporting a vehicle accessory such that the accessory may be mounted adjacent the interior rearview mirror for convenient use by the vehicle driver or other occupant without interfering with the support of the rearview mirror or its replacement, interchangeability or adjustability. Various types of accessories may be accommodated such as microphones, compass sensors, moisture sensors, radar detectors, information displays, garage door openers, keyless entry systems, vehicle identification apparatus, headlight dimmers or navigation system receivers and others.

A specific form of the invention for supporting a microphone such as that for a cellular phone is contemplated including a housing having a receptacle for the microphone and adapted to open toward the interior of the vehicle when the adaptor is mounted on the mounting support member on a window. The housing also includes an interior space for enclosing wiring and/or circuitry for the microphone. The adaptor incorporating such housing may also include a wire cover extending toward the vehicle headliner to shield and conceal electrical wiring from the microphone.

In a further aspect of the invention, a combined rearview mirror and microphone mounting assembly is provided for use in vehicles including a support for mounting a rearview mirror assembly adjacent a driver within a vehicle and means on the support for mounting a microphone adjacent the position of the rearview mirror assembly. Such assembly allows use of the mirror assembly by the vehicle driver and use of the microphone by persons within the vehicle passenger compartment, including the driver.

Accordingly, the present invention provides a convenient, easy to use adaptor for supporting rearview mirror assemblies, supporting various types of vehicle accessories near the rearview mirror assembly, and provides structure for shielding and concealing electrical wiring from either the rearview mirror assembly or the supported accessory. In addition, the invention provides support for a microphone within a vehicle for use with cellular telephones and the like.

These and other objects, advantages, purposes and features of the invention will become more apparent from a study of the following description taken in conjunction with the drawings.

DESCRIPTION OF THE PREFERRED EMBODIMENTS

Figure 1:
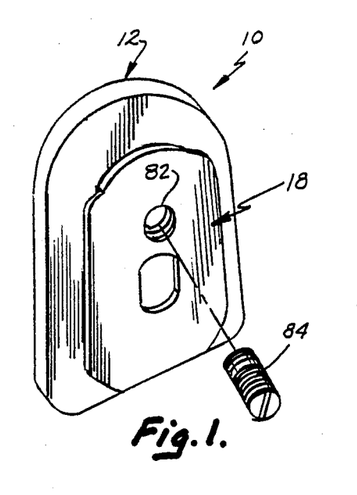
FIG. 1 is a perspective view of a first embodiment of the rearview mirror mounting adaptor of the present invention.
Figure 2:
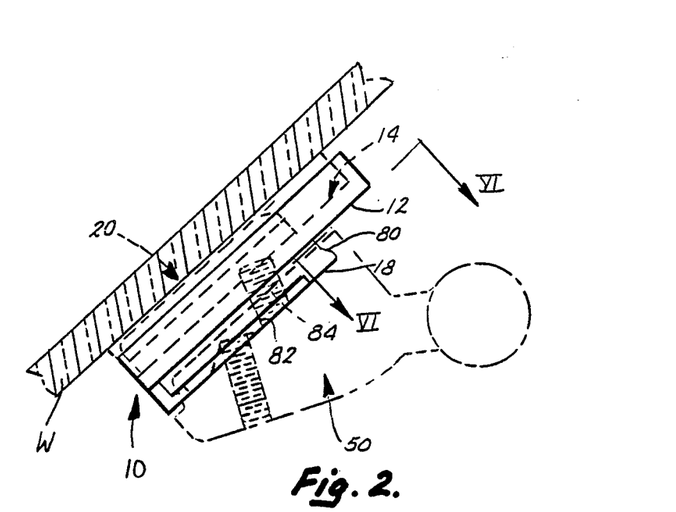
FIG. 2 is a side elevation of the adaptor of FIG. 1 shown secured to a windshield support member and having a conventional rearview mirror assembly channel mount secured to it.
Figure 11:
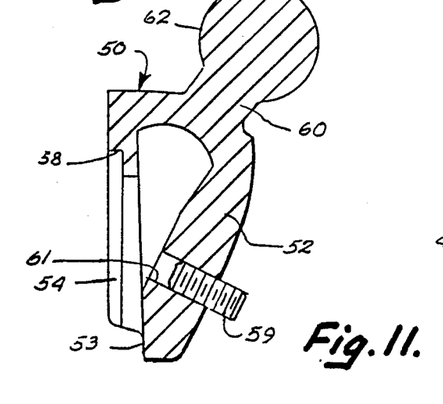
FIG. 11 is a sectional, side elevation of a channel mount member as used on conventional interior rearview mirror assemblies.
Figure 12:
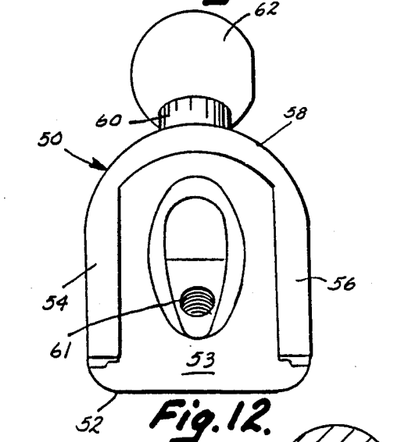
FIG. 12 is a rear elevation of the conventional channel mount member of FIG. 11.

Referring now to the drawings in greater detail, FIGS. 1-6 illustrate a first embodiment 10 of the interior rearview mirror mounting adaptor for vehicles. Adaptor 10 includes a body 12 having an open ended, recessed channel 14 on its windshield facing, back or rear surface 16 (FIGS. 3 and 5) and a front projection 18 extending toward the interior of the vehicle for receiving the channel-like mounting member or "channel mount" 50 (as it is known in the U.S. vehicle industry) from a rearview mirror assembly as shown in FIGS. 2, 11 and 12. Projection 18 thus forms a securing structure for removably attaching or mounting a rearview mirror assembly to the adaptor. Likewise, recessed channel 14 forms a mount for removably securing the entire adaptor to a window or windshield mounted support.

Figure 7:
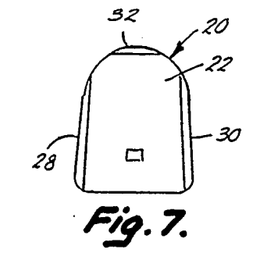
FIG. 7 is a rear elevation of a conventional, double wedge-shaped windshield mounted support member or button.
Figure 8:
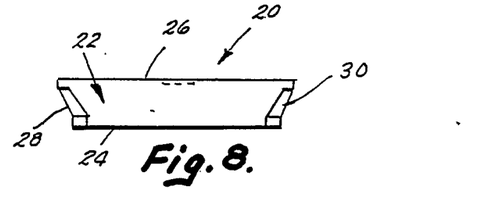
FIG. 8 is a top plan view of the windshield support member of FIG. 7.
Figure 9:
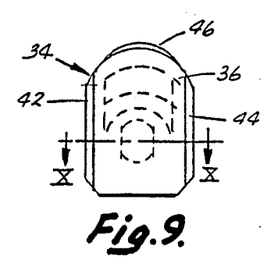
FIG. 9 is a rear elevation of an alternate type of conventional windshield mounted support member.
Figure 10:
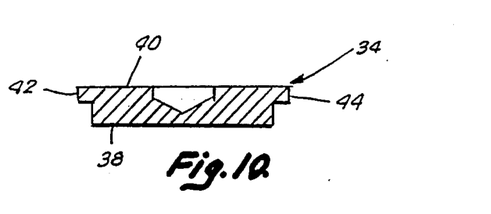
FIG. 10 is a section of the support member taken along plane X—X of FIG. 9.

As shown in FIG. 2, adaptor 10 is preferably adapted to be slidably fitted over a conventional windshield support member or windshield "button" such as that shown at 20 in FIGS. 2, 5, 7 and 8 or that shown at 34 in FIGS. 9 and 10. Windshield support member 20 includes an elongated support body 22 having a planar rear surface 24 (which faces the front of the vehicle when installed) adapted to be adhered by a suitable adhesive such as polyvinyl butyral (PVB) to the inside surface of a windshield as shown in FIG. 2. Front surface 26 of body 22 is also generally planar and faces inwardly of the vehicle interior when mounted on the windshield. On either lateral side edge of the body 22 are tapered side edges or flanges 28, 30 which taper inwardly toward the narrower rear surface 24. Also, side edges 28, 30 are nonparallel with and extend toward one another at the top end of the body 22 as seen in FIG. 6. This provides the support member with its overall double wedge shape for receiving a channel mount such as that at 50 in FIGS. 11 and 12. The top end of body 22 is rounded and may also be tapered inwardly toward rear surface 24 as at 32.

Alternately, another conventional windshield support member 34 may be used as shown in FIGS. 8 and 9. Support 34 has a body 36 including planar rear and front surfaces 38, 40 and rectilinear side edges or flanges 42, 44 which extend perpendicularly outwardly from the sides of body 36. Flanges 42, 44 are generally parallel with one another and provide an L-shaped shoulder area on either lateral side for retaining a channel mount such as that shown at 50 in FIGS. 11 and 12. Thus, support 34 has a different sectional shape than support 20 for matching a different sectional shape in a modified channel mount. The top end 46 of support member 34 is rounded and may be tapered inwardly toward rear surface 38 as in support member 20.

With reference to FIGS. 2, 11 and 12, a conventional channel-like mounting member or "channel mount" 50 is shown. Such mounting members have been used for many years in the U.S. vehicle industry to support rearview mirror assemblies on windshield mounted support members as illustrated. Channel mount 50 typically includes a body 52 cast from zinc or molded from a strong resinous plastic and has a recessed channel on its rear surface defined by longitudinal flanges 54, 56 which extend out and over the rear surface 53 of body 52 and a closed, rounded top end 58. Projecting outwardly from body 52 and formed integrally therewith is a neck 60 and ball member 62 which are adapted to mate with a corresponding socket member to form a swivel joint for supporting a rearview mirror assembly in the conventionally known manner. Depending on the precise shape of flanges 54, 56, channel mount 50 is adapted to slide over mounting support member 20 or 34 with support member 20 or 34 received through the bottom opening between flanges 54 and 56. Support member 20 or 34 slides into the channel until top end 32 or 46 abuts end 58 while flanges 54, 56 engage side edges 28, 30 or flanges 42, 44 for retention purposes.

As shown in FIG. 2, mounting adaptor 10 is also slidably fitted over the top end of a conventional windshield mounted support member such as that at 20 or 34 in a manner similar to channel mount 50. Support member 20 or 34 has previously been secured or adhered to the inside surface of windshield W. After adaptor 10 is fitted, a channel member 50 is then slidably mounted over projection 18 such that ball member 62 projects substantially horizontally into the vehicle interior and properly positions the rearview mirror assembly for use by the driver of the vehicle.

Figure 3:
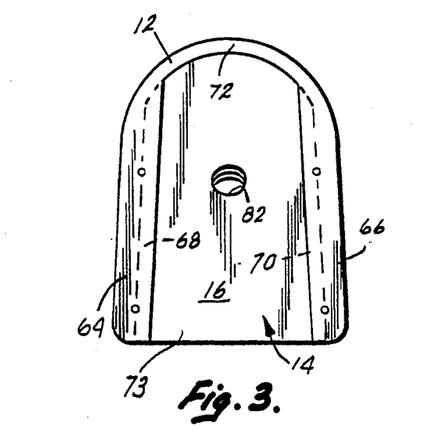
FIG. 3 is a rear elevation of the mounting adaptor of FIGS. 1 and 2.
Figure 5:
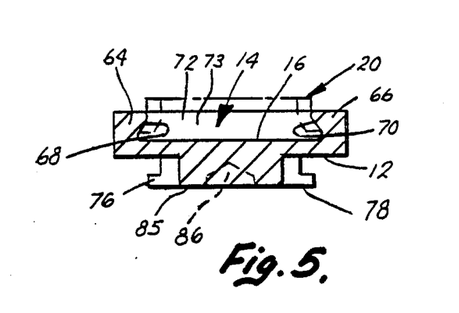
FIG. 5 is a sectional view of the mounting adaptor taken along plane V—V of FIG. 4.
Figure 6:
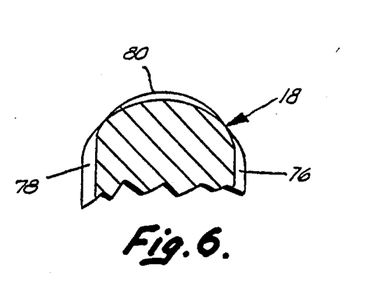
FIG. 6 is a fragmentary rear elevation of a conventional windshield support member or mounting button.

As is best seen in FIGS. 3 and 5, the channel recess 14 at the rear of adaptor 10 is formed by flanges 64, 66 which extend along the sides of body 12 on rear surface 16 and have inwardly extending surfaces 68, 70. Surfaces 68, 70 extend at an angle to one another to form a double taper or double wedge in the channel recess. A rounded top wall 72 (FIG. 3) closes the top end of recess 14 between flanges 64, 66. At the bottom end of adaptor 10 is an opening 73 between flanges 64, 66 through which the support member 20 may be inserted and slid upwardly until top end 32 abuts top wall 72 as shown in FIG. 2. As will be seen in FIG. 5, inwardly extending surfaces 68, 70 are adapted to engage and mate with side edges 28, 30 on windshield support member 20 to firmly support the adaptor on the windshield mounting button without play or vibration. Since the thickness of support 20 or 34 is greater than the depth of channel 14, adaptor 10 is spaced outwardly of windshield W. This allows the adaptor to be easily installed and prevents noise from contact between the adaptor and windshield.

Figure 4:
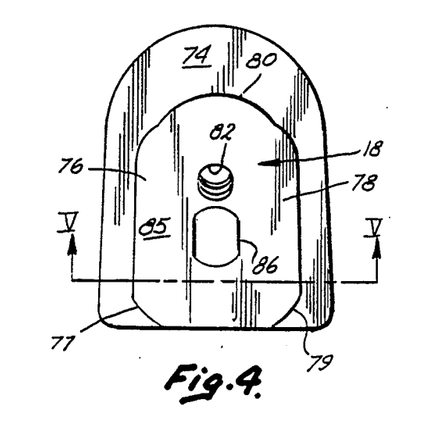
FIG. 4 is a front elevation of the mounting adaptor of FIGS. 1-3.

As shown in FIGS. 2, 4 and 5, projection 18 on the front surface 74, of adaptor 10 is elongated in the direction of adaptor 10 and includes laterally extending retaining flanges 76, 78 which extend along the lateral sides of projection 18. Flanges 76, 78 extend parallel to surface 74 and form an L shape on each side of projection 18 to provide a shoulder for retaining channel mount 50. The lower edges 77, 79 of flanges 76, 78 are rounded inwardly to avoid sharpness to reduce the chance of injury to occupants of the vehicle. The upper end 80 of projection 18 is likewise rounded and may be tapered inwardly as shown in FIGS. 2 and 6 for engagement with the top wall 58 in a channel mount such as that at 50. Projection 18 is also slightly thicker than the depth of the channel included in channel mount 50. This spaces the channel mount slightly away from surface 74 as shown in FIG. 2 to allow ease of insertion and to prevent contact between the mount and surface 74.

As shown in FIGS. 1-4, an aperture 82 is provided through projection 18 and body 12 of adaptor 10 such that it opens into the recessed channel 14 behind the adaptor and opens toward the front or interior of the vehicle as well. Aperture 82 is preferably threaded, extends at an upward angle toward the top of body 12, and receives a set screw 84 which may be tightened against the front surface 26 or 40 of one of the windshield mounted support members 20 or 34. The set screw draws surfaces 68, 70 against surfaces 28, 30 or flanges 42, 44 to tightly retain the adaptor 10 on the support member 20 or 34 without vibration, play or release. When a channel mount such as that at 50 is slidably received over projection 18, aperture 82 and set screw 84 are concealed from view. Front surface 85 of projection 18 ma also include a conical recess 86 for receiving the end of a set screw from a channel mount 50 as shown in FIG. 2 and explained more fully below.

When received over projection 18, through the opening between flanges 54, 56 in the channel mount, flanges 76, 78 engage flanges 54, 56 while end 80 engages top wall 58 in the channel mount. Although flanges 54, 56 securely retain the channel mount on the projection while gravity holds end 80 against top wall 58, additional protection against vibration or sliding movement of the channel mount on projection 18 is provided by a set screw 59 received in aperture 61 in body 52 of the channel mount. When tightened, set screw 59 is received in recess 86 to draw flanges 54, 56 tightly against the inside surfaces of flanges 76, 78 for more secure retention.

Alternately, as will be explained below, aperture 82 may be enlarged and left unthreaded such that an elongated fastener on a channel mount may be received entirely through the adaptor 10 for direct engagement with the front surface 26 or 40 of support member 20 or 34. Thus, such an elongated fastener in the channel mount would simultaneously secure both the channel mount 50 to adaptor 10 and adaptor 10 to support member 20 or 34 without the need for a second fastener (see FIG. 15).

As will also be understood, the precise sectional shape of channel recess 14 on the rear surface of adaptor 10 may have the double tapered, wedge shape of support member 20 or the rectilinear L flange shape of support member 34. Likewise, projection 18 may have the same shape as channel recess 14 or a different shape as is shown in FIG. 5 such that adaptor 10 will allow support of a rearview mirror assembly having a channel mount with a different sectional shape than that of the support member already secured to the windshield surface.

Preferably, adaptor 10 is formed from sintered metal or is die cast from zinc or another casting metal. Alternately, the adaptor may be molded from high strength resinous plastic material such as glass filled acetal. In any event, it is preferred that the material from which adaptor 10 is made be sufficiently rigid and strong to properly support the rearview mirror assembly on the windshield mounted support member.

Referring now to FIGS. 13-18, a second embodiment 90 of the mounting adaptor is illustrated. Adaptor 90 includes an adaptor body 92 which is similar in its upper portions to adaptor 10 but extends downwardly to form a mounting receptacle for a vehicle accessory such as the headlight dimmer sensor 130 shown in FIGS. 13, 15 and 16. The rear surface 94 of adaptor 90 (FIGS. 14-16) includes a recessed channel 96 similar in all respects to recessed channel 14 in adaptor 10. Channel recess 96 is adapted to receive a double tapered or wedge-shaped windshield mounted support member such as that shown at 20 in FIGS. 7 and 8 in the same manner as does recessed channel 14 as described above. Channel 96 includes inwardly tapered flanges 98, 100 which are nonparallel and extend toward one another at the top end of the adaptor which is closed by top wall 102. A bottom opening 103 is included between the lower ends of flanges 98, 100.

Figure 13:
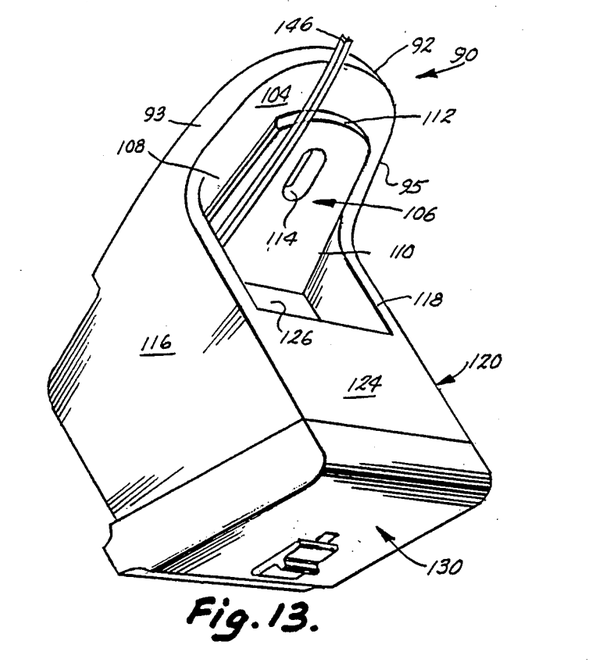
FIG. 13 is a perspective view of a second embodiment of the rearview mirror mounting adaptor including a receptacle support for attachment of a vehicle accessory.
Figure 14:
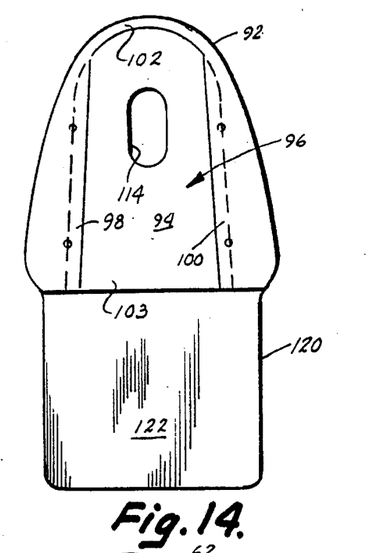
FIG. 14 is a rear elevation of the mounting adaptor of FIG. 13.

On the front surface 104 of adaptor body 92 is an elongated projection 106 similar to but of different sectional shape from projection 18 on adaptor 10. Projection 106 has a sectional shape which is substantially identical to that of channel recess 96. Hence, adaptor 90 may be fitted between a windshield mounted support member 20 and a channel mount 50 which would otherwise be received on support member 20 such that adaptor 90 spaces the channel mount outwardly from the support member 20 but otherwise secures it in the same manner. As explained below, adaptor 90 also provides support structure for a vehicle accessory adjacent the rearview mirror assembly such that the accessory is conveniently located for driver use or operation adjacent the mirror assembly. Yet, adaptor 90 allows removable attachment of rearview mirror assemblies without disturbing the accessory Likewise, the accessory does not interfere with use of the rearview mirror assembly.

Figures 15, 16, 17, 18:
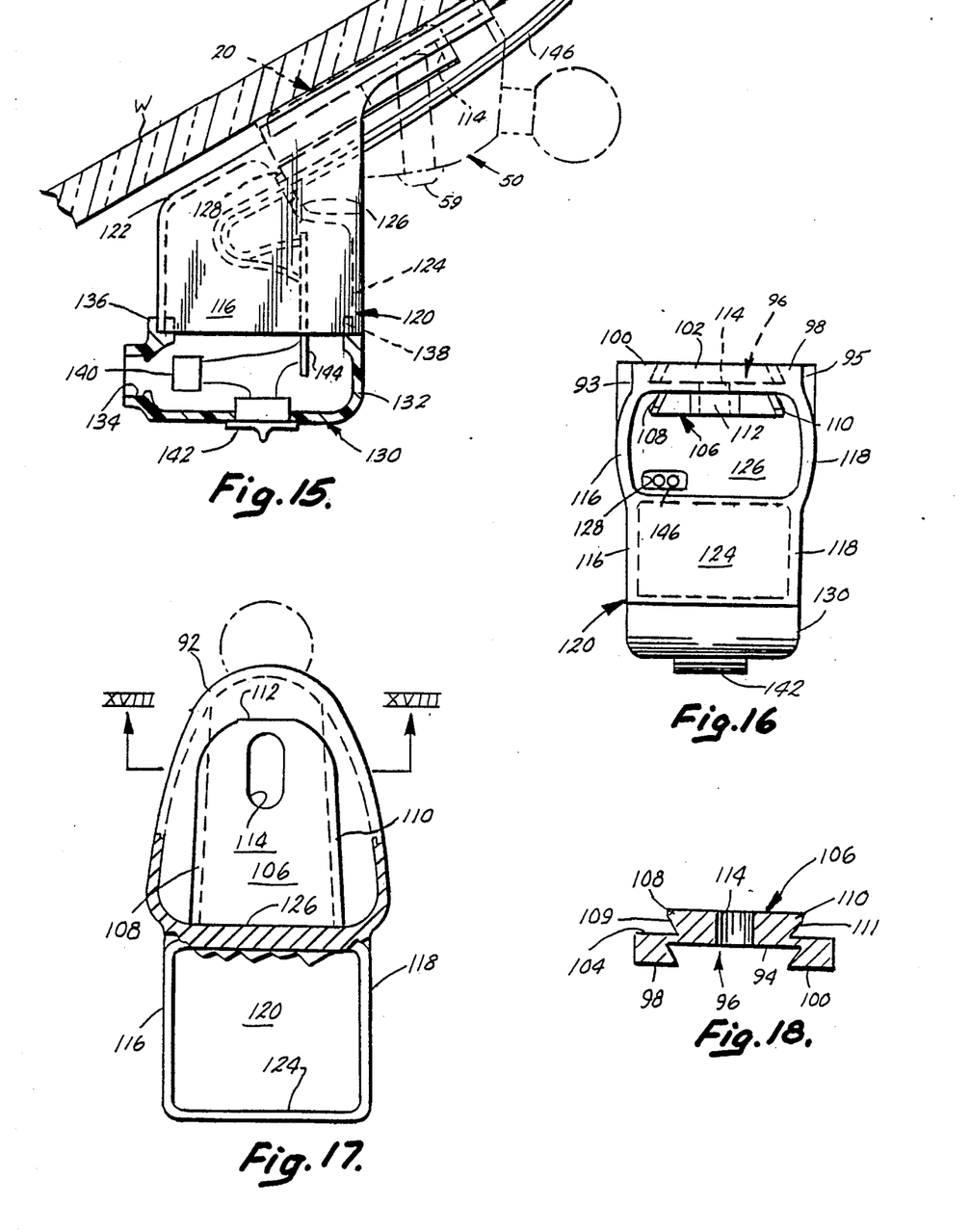
FIG. 15 is a side elevation of the mounting adaptor of FIGS. 13 and 14 with a headlight dimming sensor shown in section secured in the support receptacle and the adaptor mounted on the inside surface of a windshield.
FIG. 16 is a top plan view of the mounting adaptor of FIGS. 13-15.
FIG. 17 is a front elevation of the mounting adaptor of FIGS. 13-16 shown partially in section.
FIG. 18 is a sectional view of the mounting adaptor of FIGS. 13-17 taken along plane XVIII—XVIII of FIG. 17.

With reference to FIGS. 13 and 15-17, the accessory support structure on adaptor 90 includes a pair of parallel, generally planar sidewalls 116, 118 which are integral with and extend downwardly from the side edges 93, 95 of adaptor body 92 beginning at an area approximately even with the midpoint of projection 106. Sidewalls 116, 118 form the lateral sides of a rectangular receptacle 120 which also includes an angled rear wall 122 which extends downwardly from the lower end of adaptor body 92 as well as a forward wall 124 which faces the interior of the vehicle when the adaptor is mounted on the windshield support member 20. Intermediate sidewalls 116, 118 is a top wall 126 which defines the bottom of a depressed well partially enclosing projection 106. Wall 126 also includes a wiring aperture 128 through which electrical wiring for operating the accessory supported in receptacle 120 extends as shown in FIGS. 13 and 15.

As will now be understood from FIGS. 13, 15 and 16, a vehicle accessory such as a headlight dimming sensor 130, including a housing 132 having a light receiving opening 134 and mounting flanges 136, 138, is received in the opening to receptacle 120 by engagement with walls 116, 18, 122 and 124. Dimming sensor 130 includes an appropriate light sensing/electrical signaling device 140 connected to a slide switch 142 controlling the operation of the dimmer and an appropriate electrical circuit included on circuit board 144 which is connected to the vehicle electrical system via wiring 146 passing through aperture 128 in top wall 126. When positioned on the windshield mounted support member 20, which is slanted at the rearwardly inclined angle of the windshield, adaptor 90 supports receptacle 120 such that it opens vertically downwardly and holds the housing 132 of headlight dimming sensor 130 substantially horizontally such that opening 134 is aligned toward the front of the vehicle. Headlights impinging on the vehicle from the opposite direction are received through opening 134 on sensor 140 when switch 142 is on.

As shown in FIG. 15, a rearview mirror assembly supported by channel mount 50 may be supported on projection 106 simultaneously without affecting sensor 130. When so mounted, the channel mount 50 extends partially into the well partially enclosing projection 106 and is secured directly to the front surface 26 of support member 20 by fastener 59 passing through aperture 114. This simultaneously retains adaptor 90 in position on the support member 20 and eliminates the need for a second fastener as used in embodiment 10.

If desired a wire cover having a snap-on, clamp-type mount of the type disclosed in co-pending, commonly assigned United States patent application Ser. No. 021,636, filed Mar. 4, 1987, the disclosure of which is hereby incorporated by reference, may be attached to channel mount 50 to shield and conceal wires 146 as they extend from adaptor 90 along the inside surface of windshield W to the headliner area of the vehicle.

As with adaptor 10, adaptor 90 may be formed from sintered metal, cast from zinc or other metal, or molded from a suitably rigid resinous plastic material such as glass filled acetal. Of course, support 120 may be used or modified to support other vehicle accessories such as a compass sensor, radar detector, information display, garage door opener, keyless entry system, vehicle security identification, rain sensor or navigation system receiver. Also, the support may be included above as well as below the adaptor body with shapes designed for and fitted to the particular accessory being supported. Further, supports both above and below the adaptor body may be used. For example, a compass sensor could be supported below the adaptor body and mirror assembly with an information readout for the compass supported above the adaptor body and mirror assembly for viewing by the vehicle occupants and driver.

Figure 19:
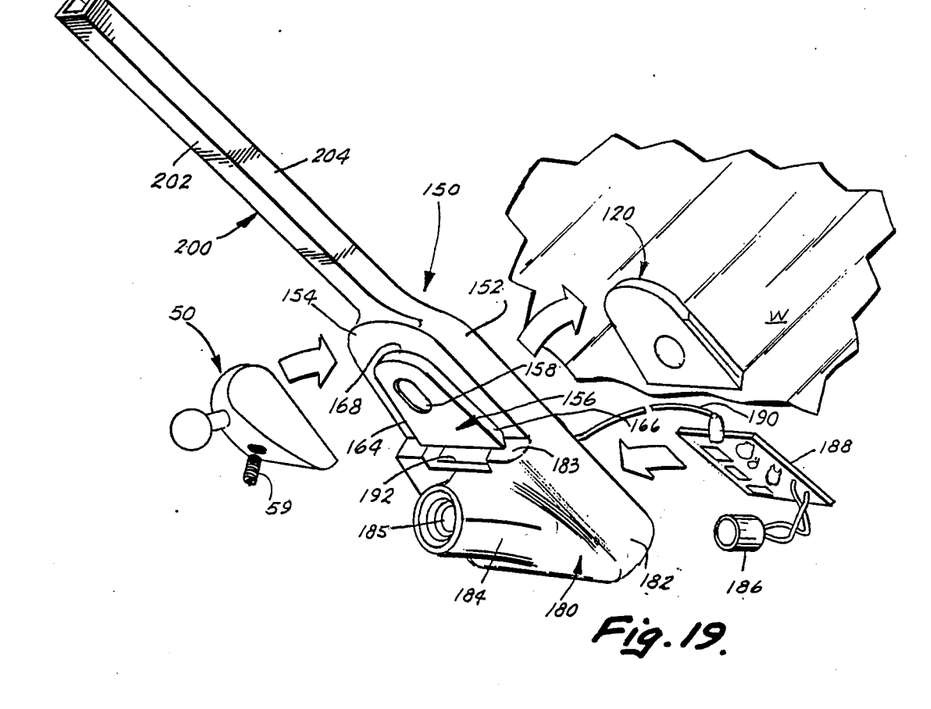
FIG. 19 is an exploded, perspective view of a third embodiment of the mounting adaptor of the present invention including a housing for supporting a microphone and a wire cover.
Figure 20:
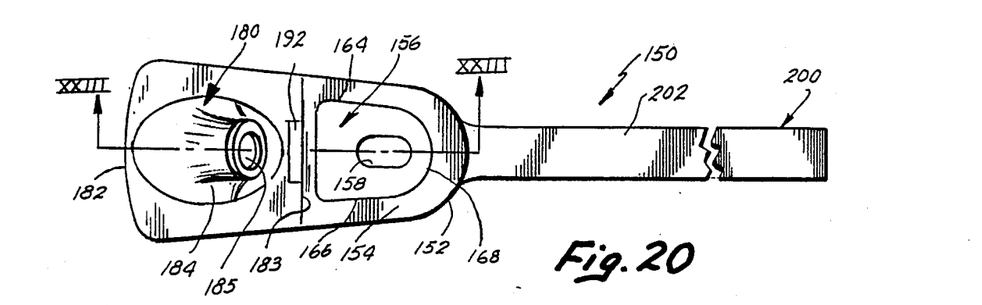
FIG. 20 is a broken, front elevation of the mounting adaptor of FIG. 19.

Referring now to FIGS. 19-27, a third embodiment 150 of the mounting adaptor is illustrated. Adaptor 150 is a hybrid form of the invention including an adaptor body 152, a housing 180 integral with and positioned below the adaptor body for a microphone for a cellular phone, dictation system or the like and its controlling circuitry and wiring, and a wire cover 200 also integral with the adaptor body and extending from the adaptor body in an opposite direction from the microphone housing. As is seen in FIGS. 19 and 20, adaptor body 152 includes a front surface 154 on which is located a double tapered, wedge-type projection 156 substantially similar to projection 106 on adaptor embodiment 90. A fastener aperture 158 extends through projection 156 and communicates with a recessed channel 160 (FIGS. 23 and 24) on rear surface 162. Projection 156 includes inwardly tapered side edges 164, 166 adapted to mate with flanges 54, 56 on a channel mount such as that shown at 50 in FIGS. 11 and 12 for retention purposes. A rounded top end 168 joins flanges 164, 166. Projection 156 has a thickness slightly greater than the depth of the recessed channel of channel mount 50 to prevent contact between mount 50 and surface 154.

Recessed channel 160 on the rear surface of body 152 is formed by outwardly extending lateral flanges 170, 172 having inwardly flared retaining surfaces 174, 176. Flanges 170, 172 are nonparallel and extend toward one another toward the top of body 152 and provide recessed channel 160 with a double tapered, wedge shape adapted to receive a windshield mounted support member 20 through opening 173 between the flanges as shown in FIGS. 7, 8 and 19. The depth of recessed channel 160 is slightly less than the thickness of support member 20 to prevent contact between adaptor body 152 and the inside windshield surface. Accordingly, when positioned on a windshield mounted support member 20, projection 156 will face inwardly toward the interior of the vehicle for receipt of a channel mount 50 which, in turn, supports a rearview mirror assembly. Microphone housing 180 is supported below the adaptor body 152 while wire cover 200 extends upwardly toward the vehicle headliner above the adaptor body. Although microphone housing 180 and wire cover 200 are adjacent the rearview mirror assembly, neither interferes with the operation, removability, or adjustability of the mirror assembly or vice-versa.

Figure 22:
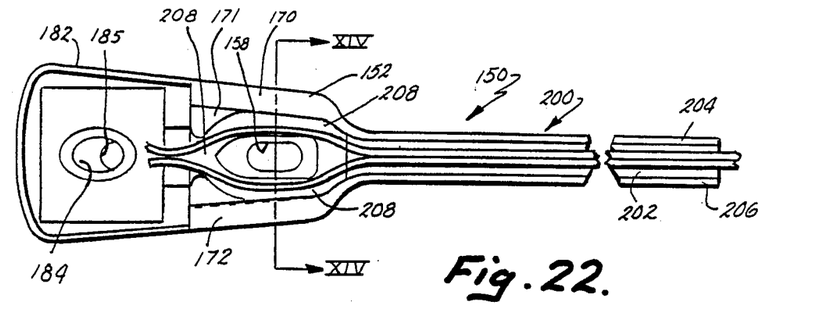
FIG. 22 is a broken, rear elevation of the mounting adaptor of FIGS. 19-21.
Figure 23:
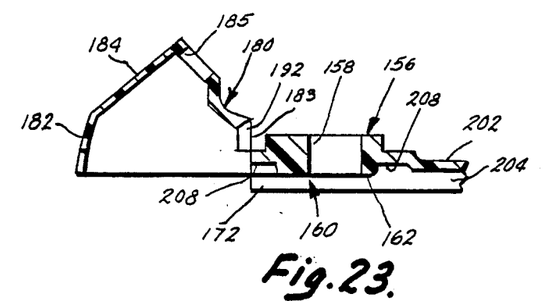
FIG. 23 is a fragmentary, sectional, side elevation of the mounting adaptor taken along plane XXIII—XXIII of FIG. 20.
Figure 24:
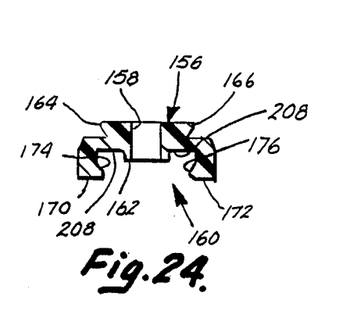
FIG. 24 is a sectional view of the mounting adaptor taken along plane XXIV—XXIV of FIG. 22.

Microphone housing 180 includes a slightly trapezoidal housing 182 when viewed from the front which is integral with, extends continuously from, and is generally parallel to adaptor body 152. An integrally formed generally cylindrical microphone cylinder 184 extends at an angle to the general extent of housing 182. Housing 182 is formed by four walls with a generally hollow interior as seen in FIGS. 22 and 23. That hollow interior may receive a microphone sensor such as that shown at 186 and an appropriate microphone circuit board 188 and wiring 190. The forward facing wall of housing 182 merges outwardly into microphone cylinder 184 which includes opening 185 through which sound waves may pass to microphone sensor 186. A rectangular aperture 192 at the top wall of housing 182 is included for insertion of an appropriate mold part to allow formation of the bottom wall of projection 156. Aperture 192 also provides access to the interior of the housing to allow insertion of wires leading from any lights or electrical accessories in the adjacent rearview mirror assembly so they may be concealed behind wire cover 200 as they extend toward the vehicle headliner with wires 190. Top wall 183 of the housing is substantially planar and is adapted to lie adjacent to or abut the bottom of a channel mount such as that shown at 50 when received over projection 156. Thus, the general exterior shape of housing 182 merges into the general shape of the channel mount 50. Likewise, the side surfaces of adaptor body 152 generally lie flush with the side edges of channel mount 50 when mounted on projection 156.

Figure 21:
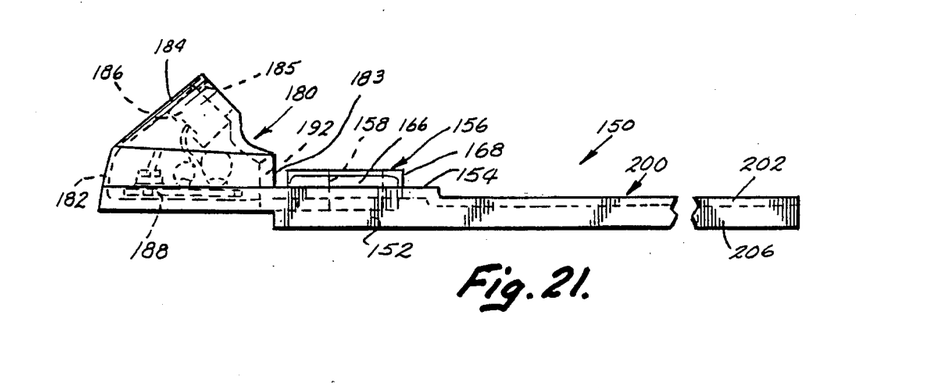
FIG. 21 is a broken, side elevation of the mounting adaptor of FIGS. 19 and 20.

At the upper end of body 152 wire cover 200 extends rectilinearly upwardly away from adaptor body 152. Wire cover 200 is a channel member including a front wall 202 and rearwardly extending sidewalls 204, 206 which define a rear opening to the channel. Front wall 202 merges into the top wall of adaptor body 152 while sidewalls 204, 206 merge into the sidewalls of adaptor body 152. The internal space within channel member 200 communicates with the recessed channel 160 at the rear of adaptor body 152 which, in turn, communicates with the internal space within housing 182 and microphone cylinder 184 as is shown in FIGS. 21-23. In order to allow access space for wiring 190 to microphone circuit 188 and sensor 186 from the headliner area of the vehicle, through the interior space in channel 200, a bifurcated, recessed channel 208 is formed in the rear surface 162 of adaptor body 152. Channel 208 includes left and right branches which merge adjacent the top and bottom of aperture 158 into a single channel. At the top of body 152 channel 208 merges into the interior space of channel member 200. Adjacent the bottom end of aperture 158 channel 208 merges into the interior space of housing 182 and also communicates with aperture 192. Since channel 208 is deep enough to receive wiring 190 below the level of rear surface 162, channel recess 160 may still receive windshield mounted support member 20 therein without causing obstruction or wear on wiring 190. When inserted, wiring 190 continues unimpeded from the interior of housing 152 through channel 208 adjacent support member 20 when it is received in channel recess 160 and on into the interior of channel member 200 to the headliner area of the vehicle.

Figure 25:
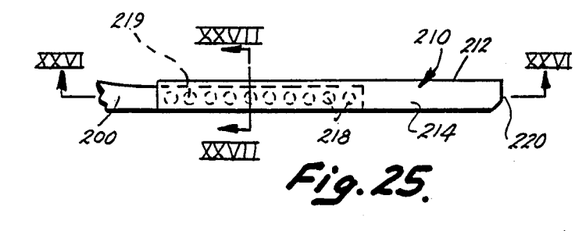
FIG. 25 is a fragmentary side elevation of a modified wire cover extension for use with a mounting adaptor such as that shown in FIGS. 19-24.
Figure 26:
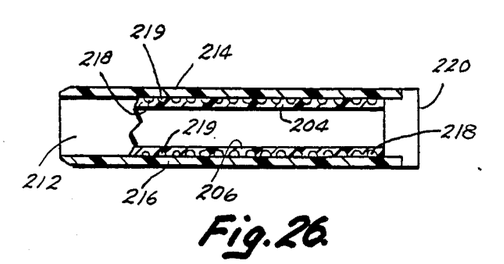
FIG. 26 is a sectional rear elevation of the wire cover extension taken along plane XXVI—XXVI of FIG. 25.
Figure 27:
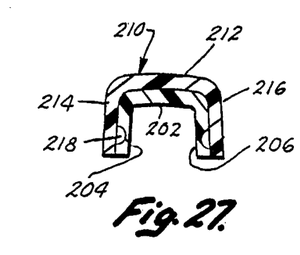
FIG. 27 is a sectional end view of the wire cover extension taken along plane XXVII—XXVII of FIG. 25.

Since the distance between the support member 20 on the windshield's inner surface and the vehicle headliner is different for each type of vehicle, mounting adaptor 150 may be provided with an extension for wire cover 200 as shown in FIGS. 25–27. Such extension is provided by a second rectilinear channel member 210 which slidably telescopes over channel 200 and includes a front wall 212 which is slightly wider than the entire width of channel 200 and a pair of parallel, rearwardly extending sidewalls 214, 216 which extend along the exterior surface of sidewalls 204, 206 as shown in FIGS. 25–27.

In order to position channel extension 210 with respect to channel member 200, a series of semi-spherical depressions 218 are formed in the outer surfaces of sidewalls 204, 206 of channel 200 near the upper end thereof. A pair of inwardly extending semi-spherical projections 219 are formed on the inner surface of sidewalls 214, 216 of channel extension 210 adjacent its lower end for receipt in an opposing pair of semi-spherical recesses 218. Accordingly, when the distance between the support member 20 and the headliner is known, the channel extension 210 may be positioned to cover the extra distance between the upper end of channel 200 and the headliner and snapped into place with semi-spherical projections 220 received in one pair of the semi-spherical recesses 218 to hold the extension in place. Sidewalls 214, 216 may be flexed outwardly sufficiently to allow insertion of the projections 219 into recesses 218. Also, upper end 220 of channel extension 210 may include a flange as disclosed in co-pending application Ser. No. 21,636 referred to above for receipt under the vehicle headliner to help retain it in place.

As with mounting adaptors 10 and 90, adaptor 150 may be formed from sintered metal, or, more preferably, molded from a sufficiently rigid resinous plastic material in one piece. Channel extension 210 may be separately molded from resinous plastic for the telescoping fit with channel 200. When mounted on support member 20 via opening 173 to channel recess 160, a microphone sensor 186 for a cellular phone, recording/dictation system or the like may be received in microphone cylinder 184 and is connected via wiring 190 to the vehicle electrical system. When a rearview mirror assembly including a channel mount such as that shown at 50 is received over projection 156 and secured through aperture 158 with fastener 59 on the channel mount to support member 20, the mirror assembly is positioned in front of and immediately adjacent and above the microphone housing 180. Wiring 190 and any wiring leading from the mirror assembly is concealed from view in the passenger compartment by wire cover 200 and channel extension 210 as it extends to the headliner of the vehicle. Both the mirror assembly and the microphone are thus conveniently positioned for access adjacent the driver while the microphone is in a position above the dashboard of the vehicle where voices from others in the passenger compartment of the vehicle can be properly received. Of course, as with adaptors 10 and 90, projection 156 may have a sectional shape different from that of recessed channel 160 so that the adaptor will effectively convert from one type channel mount or rearview mirror assembly to another.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows:

1. A mounting adaptor for securing an accessory adjacent an interior rearview mirror in a vehicle, said adaptor comprising:
   an adaptor body;
   first mounting means on a first surface of said adaptor body for securing said adaptor body to a mounting support member when the support member is secured to the inner surface of a vehicle window such as a windshield;
   securing means on a second surface of said adaptor body for removably mounting a rearview mirror assembly on said adaptor body;
   said adaptor body also including support means for supporting a vehicular accessory; said support means including means for positioning the vehicle accessory for exposure to and visibility from the interior of the vehicle and/or for exposure to the vehicle exterior through the vehicle window on which the adaptor body is mounted;
   whereby the accessory may be mounted adjacent the interior rearview mirror for proper operation of the accessory and/or convenient use by the vehicle driver or other occupant without interfering with the support of the rearview mirror, or its replacement, interchangeability or adjustability.

2. The mounting adaptor of claim 1 wherein said support means include a support for attaching a vehicle accessory including at least one of a headlight dimmer, moisture sensor, compass sensor, radar detector, information display, garage door opener, keyless entry system, vehicle identification apparatus, or navigation system receiver and means for securing said support to said body.

3. The mounting adaptor of claim 1 wherein said support means include a receptacle for receiving at least a portion of an accessory.

4. The mounting adaptor of claim 1 wherein said support means includes an aperture therethrough for passing an electrical wire to or from an accessory when mounted on said support.

5. The mounting adaptor of claim 1 wherein said support means include means for mounting a microphone on said adaptor body.

6. The mounting adaptor of claim 5 wherein said means for mounting a microphone include a housing including a receptacle for a microphone adapted to open toward the interior of the vehicle when said adaptor is mounted on the mounting support member on a window, said housing also including an interior space for enclosing wiring and/or circuitry for the microphone.

7. The mounting adaptor of claim 6 wherein said receptacle for the microphone is on a lower end of said adaptor body; said body including a wire cover extending therefrom opposite said lower end toward the interior roof area of the vehicle for shielding electrical wiring extending from the roof area to the microphone.

8. The mounting adaptor of claim 7 wherein said wire cover is an elongated, hollow channel member opening toward said first surface of said adaptor body and the window when said adaptor is mounted on the support member on a window, said body including channel means in said first surface communicating with said channel member for routing wiring from said interior space of said housing to said channel member.

9. The mounting apparatus of claim 8 wherein said channel member includes a telescoping extension member slidably mounted thereon for adjusting the length of said channel member wire cover.

10. The mounting apparatus of claim 8 wherein said adaptor body includes an aperture extending through said body and communicating with said first mounting means at said first surface for receiving a fastener for engaging the mounting support.

11. The mounting adaptor of claim 1 including a wire cover extending from said adaptor body for concealing any electrical wiring leading to or from said adaptor from or to another portion of the vehicle when said adaptor is installed in a vehicle.

12. The mounting adaptor of claim 11 wherein said wire cover is an elongated, hollow channel member opening toward said first surface of said adaptor body and the window when said adaptor is mounted on the support member on a window.

13. The mounting adaptor of claim 1 including an aperture extending through said body and communicating with said first mounting means for receiving a fastener for engaging the mounting support.

14. The mounting adaptor of claim 1 wherein said first mounting means include a recessed channel for receiving the mounting support member; said securing means including projecting means extending outwardly from said second surface for receiving a channel-like mounting member from the rearview mirror assembly.

15. The mounting adaptor of claim 14 including an aperture extending through said body and communicating with said recessed channel for receiving a fastener for engaging the mounting support; said aperture in said body extending through said projecting means such that a fastener on the channel-like mounting member may pass therethrough to engage the mounting support.

16. The mounting adaptor of claim 14 wherein said aperture includes a fastener for securing said adaptor to the mounting support.

17. The mounting adaptor of claim 16 wherein said first mounting means also include a pair of spaced, inwardly inclined side flanges, an end wall joining said inclined side flange to form a closed end, and an open end opposite said closed end, said recessed channel adapted to slidably receive the mounting support therein through said open end; said aperture and fastener being located in said projection means and inclined from said projection means toward said closed end wall.

18. The mounting adaptor of claim 1 wherein said first mounting means include first flanges extending along either lateral side edge of said body on said one surface and defining a recessed channel, an end wall defining a closed end at one end of said recessed channel, and an open end opposite said closed end, said recessed channel being adapted to slidably receive the mounting support member therein for retention by said flanges; said securing means including an elongated projection and second flanges extending along either lateral side edge of said projection for cooperation with a channel-like mounting member from a rearview mirror assembly for retention thereof, said projection adapted to be received in the recessed channel of the channel-like mounting member to support the mounting member thereon.

19. The mounting adaptor of claim 18 wherein said first flanges are tapered inwardly toward one another as they extend away from said one surface; said second flanges extending laterally out from said projection generally parallel to but spaced from said one surface wherein said projection will receive a channel-like mounting member having a recessed channel with a different cross-sectional shape than said recessed channel on said one surface.

20. The mounting adaptor of claim 18 wherein said recessed channel is wedge-shaped with said first flanges being nonparallel to one another and extending toward one another at said closed end, said open end being wider than said closed end.

* * * * *

UNITED STATES PATENT AND TRADEMARK OFFICE
CERTIFICATE OF CORRECTION

PATENT NO. : 4,930,742
DATED : June 5, 1990
INVENTOR(S) : Schofield, et al

It is certified that error appears in the above-identified patent and that said Letters Patent is hereby corrected as shown below:

Column 7, line 21

"ma" should be -- may --

Column 8, line 58

"18" should be -- 118 --

Signed and Sealed this

Tenth Day of December, 1991

Attest:

HARRY F. MANBECK, JR.

*Attesting Officer*     *Commissioner of Patents and Trademarks*